(12) United States Patent
Aoyagi et al.

(10) Patent No.: US 8,819,662 B2
(45) Date of Patent: Aug. 26, 2014

(54) DEVICE AND METHOD FOR TIME NOTIFICATION FOR UPDATING SOFTWARE

(75) Inventors: Katsumi Aoyagi, Tokyo (JP); Miki Suzuki, Tokyo (JP); Yasuyuki Hirao, Tokyo (JP); Hidefumi Kaneko, Tokyo (JP); Takeshi Kanemoto, Tokyo (JP); Tomohiro Ichikawa, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 255 days.

(21) Appl. No.: 13/493,692

(22) Filed: Jun. 11, 2012

(65) Prior Publication Data

US 2013/0332918 A1    Dec. 12, 2013

(51) Int. Cl.
*G06F 9/44*    (2006.01)

(52) U.S. Cl.
USPC .......................................................... 717/168

(58) Field of Classification Search
CPC ................ G06F 8/65; G06F 8/67; G06F 8/68
USPC .................................................. 717/168–173
See application file for complete search history.

(56) References Cited

U.S. PATENT DOCUMENTS

| 8,407,078 B1* | 3/2013 | Caputo et al. ................. 705/7.27 |
| 2009/0231215 A1 | 9/2009 | Taura |
| 2011/0093853 A1* | 4/2011 | Bobak et al. ................... 718/100 |
| 2012/0011173 A1* | 1/2012 | Ohata et al. .................... 707/812 |
| 2012/0091821 A1 | 4/2012 | Kato |
| 2012/0303783 A1* | 11/2012 | Sakaguchi et al. ............ 709/223 |

FOREIGN PATENT DOCUMENTS

| WO | 2007/058230 A1 | 5/2007 |
| WO | 2010/122685 A1 | 10/2010 |
| WO | 2010/122888 A1 | 10/2010 |

* cited by examiner

*Primary Examiner* — Anna Deng
(74) *Attorney, Agent, or Firm* — Snyder, Clark, Lesch & Chung, LLP (57) ABSTRACT

A terminal device may include: a communication interface to receive, from a server via a network, a file for updating software in a memory device coupled with the terminal device, and a software update table that includes data regarding one or more performance values and one or more time values indicative of one or more lengths of time taken to update the software using the file; a processor to obtain data regarding a performance value of the memory device, select, from the software update table, one of the one or more performance values based on the performance value of the memory device, and obtain, from the software update table, a time value associated with the selected performance value; and an output device to provide an output corresponding to the obtained time value. Each performance value is associated with one of the one or more time values, respectively.

20 Claims, 8 Drawing Sheets

| VENDOR ID | WRITE SPEED (Mbps) | LENGTH OF TIME TAKEN TO UPDATE SOFTWARE (min) |
|---|---|---|
| A | 5.0 | X1 |
| A | 10.0 | X2 |
| B | 10.0 | Y1 |
| B | 13.0 | Y2 |
| C | 15.0 | Z1 |
| C | 20.0 | Z2 |

DEVICE AND METHOD FOR TIME NOTIFICATION FOR UPDATING SOFTWARE

TECHNICAL FIELD

Embodiments disclosed relate generally to a terminal device and method for time notification for updating software installed in the terminal device.

BACKGROUND

Firmware and software installed in a terminal device may be updated via a network. A user of the terminal device may remotely obtain the latest version of firmware/software installed in the terminal device via a network. For example, Firmware Over-the Air (FOTA) technology may be used for updating firmware/software installed in the terminal device wirelessly.

SUMMARY

In one aspect, a terminal device may include: a communication interface configured to receive, from a server via a network, a file for updating software stored in a memory device coupled with the terminal device, and a software update table wherein the software update table includes data regarding one or more performance values and data regarding one or more time values indicative of one or more lengths of time taken to update the software using the file, respectively, and each of the one or more performance values is associated with one of the one or more time values; a processor configured to obtain data regarding a performance value of the memory device, select, from the software update table, one of the one or more performance values based on the performance value of the memory device, and obtain, from the software update table, a time value associated with the selected performance value; and an output device configured to provide an output corresponding to the obtained time value.

In one aspect, the memory device may be an embedded Multi Media Card.

In one aspect, the server may be a Firmware Over-The Air (FOTA) server.

In one aspect, the file may be a difference file for updating the software using FOTA technology.

In one aspect, the performance value of the memory device may indicate a write speed of the memory device.

In one aspect, the one or more performance values included in the software update table may indicate one or more write speeds of one or various memory devices, respectively.

In one aspect, the write speed may be calculated based on a size of the software and a length of time taken to write the software on the memory device.

In one aspect, the selected performance value may match the performance value of the memory device.

In one aspect, the software update table may further include data regarding identifications (IDs) of various memory devices, and each of the one or more performance values may be associated with one of the IDs.

In one aspect, the IDs may identify vendors providing the various memory devices, respectively.

In one aspect, the processor may further be configured to: obtain an ID of the memory device, and select, from the software update table, one or more performance values associated with an ID matching the ID of the memory device. The selected one of the one or more performance values based on the performance value of the memory device may be one of the selected one or more performance values associated with an ID matching the ID of the memory device In one aspect, the output device may be configured to provide the output corresponding to the obtained time value by at least one of: displaying information corresponding to the obtained time value on a display of the terminal device, and generating audible information corresponding to the obtained time value.

In one aspect, the processor may further be configured to: allow a user of the terminal device to start, decline, postpone, or stop an update of the software based on the obtained time value.

In one aspect, a terminal device may include: a processor configured to: obtain an estimated total length of time to be taken for an update of software stored in a memory device coupled with the terminal device, obtain a measured first length of time between a point of time of starting the update of the software and a first point of time when a size of an updated portion of the software reaches a predetermined size, obtain an estimated first length of time between the point of time of starting the update of the software and a point of time when the size of the updated portion of the software reaches the predetermined size, based on the estimated length of time and the predetermined size, obtain a difference between the estimated first length of time and the measured first length of time, and when the difference is more than a predetermined value, calculate a first length of remaining time to be taken to complete the update of the software, based on the measured first length of time and the predetermined size; and an output device configured to provide an output corresponding to the calculated first length of remaining time.

In one aspect, the processor may further be configured to: determine whether the update of the software is completed, and if the update of the software is determined as not being completed, change the predetermined size to an other size, obtain a measured second length of time between the point of time of starting the update of the software and a second point of time when the size of the updated portion in the software reaches the other size, and calculate a second length of remaining time to be taken to complete the update of the software, based on the measured second length of time and the other size, and the output device may further be configured to provide an output corresponding to the calculated second length of remaining time.

In one aspect, the processor may further be configured to obtain a length of remaining time to be taken to complete the update of the software, based on the predetermined size and the obtained total length of time, when the difference is equal to or less than the predetermined value, and the output device may further be configured to provide an output corresponding to the obtained length of remaining time.

In one aspect, a method implemented by a terminal device may include: receiving, from a server via a network, a file for updating software stored in a memory device coupled with the terminal device, and a software update table wherein the software update table includes data regarding one or more performance values and data regarding one or more time values indicative of one or more lengths of time taken to update the software using the file, respectively, and each of the one or more performance values is associated with one of the one or more time values; obtaining data regarding a performance value of the memory device; selecting, from the software update table, one of the one or more performance values based on the performance value of the memory device; obtaining, from the software update table, a time value associated with the selected performance value; and providing an output corresponding to the obtained time value at an output device of the terminal device.

In one aspect, a method implemented by a terminal device may include: obtaining, from a server via a network, an estimated total length of time to be taken for an update of software stored in a memory device coupled with the terminal device; obtaining a measured first length of time between a point of time of starting the update of the software and a first point of time when a size of an updated portion of the software reaches a predetermined size; obtaining an estimated first length of time between the point of time of starting the update of the software and a point of time when the size of the updated portion of the software reaches the predetermined size, based on the estimated length of time and the predetermined size; obtaining a difference between the estimated first length of time and the measured first length of time; when the difference is more than a predetermined value, calculate a first length of remaining time to be taken to complete the update of the software, based on the measured first length of time and the predetermined size; and providing an output corresponding to the calculated first length of remaining time at an output device of the terminal device.

In one aspect, the method may further include: determining whether the update of the software is completed; if the update of the software is determined as not being completed, changing the predetermined size to an other size; obtaining a measured second length of time between the point of time of starting the update of the software and a second point of time when the size of the updated portion in the software reaches the other size; calculating a second length of remaining time to be taken to complete the update of the software, based on the measured second length of time and the other size; and providing an output corresponding to the calculated second length of remaining time at the output device of the terminal device.

In one aspect, the method may further include: when the difference is equal to or less than the predetermined value, obtaining a length of remaining time to be taken to complete the update of the software, based on the predetermined size and the obtained length of time; providing an output corresponding to the obtained length of remaining time at the output device of the terminal device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements.

To update the firmware/software in a terminal device, the entire portion of the firmware/software currently installed the terminal device may be replaced with the entire portion of a new version of the firmware/software.

Alternatively, when the new version of the firmware/software includes one or more different parts from the currently installed firmware/software while the remaining part in the new version of the firmware/software is the same as a corresponding part of the currently installed firmware/software, the currently installed firmware/software may be updated with respect to the one or more different parts while the currently installed firmware/software may not be updated with respect to the remaining part.

Figure 1:
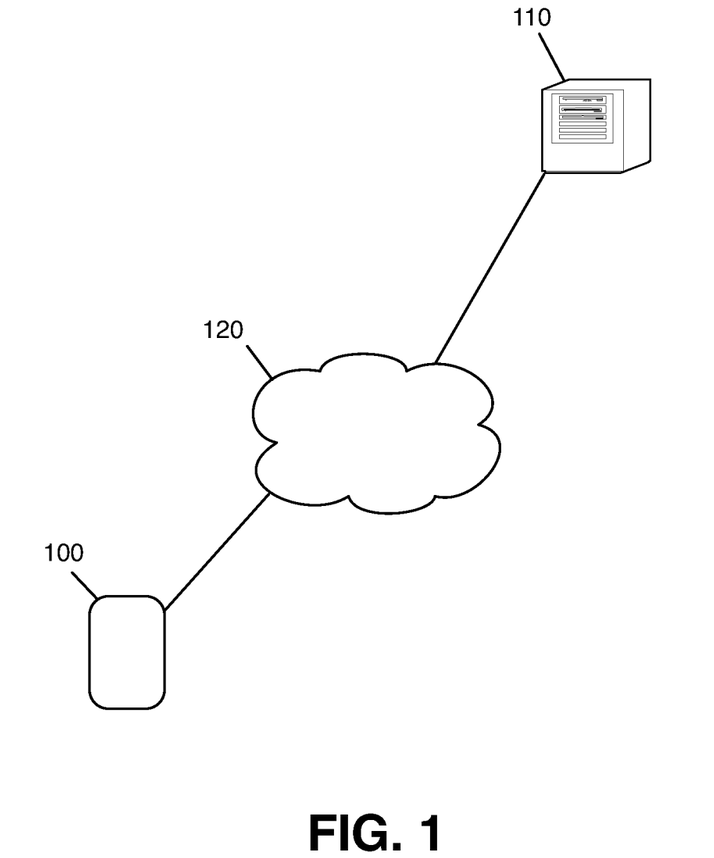
FIG. 1 is a diagram of an exemplary environment in which embodiments disclosed herein are implemented.

FIG. 1 is a diagram of an exemplary environment in which embodiments disclosed herein are implemented. A terminal device 100 may be connected to a server 110 via a network 120. The network 120 may be wireless. The server 110 may a FOTA server. The server 110 may distribute data regarding an update of software installed in the terminal device 100.

Figure 2:
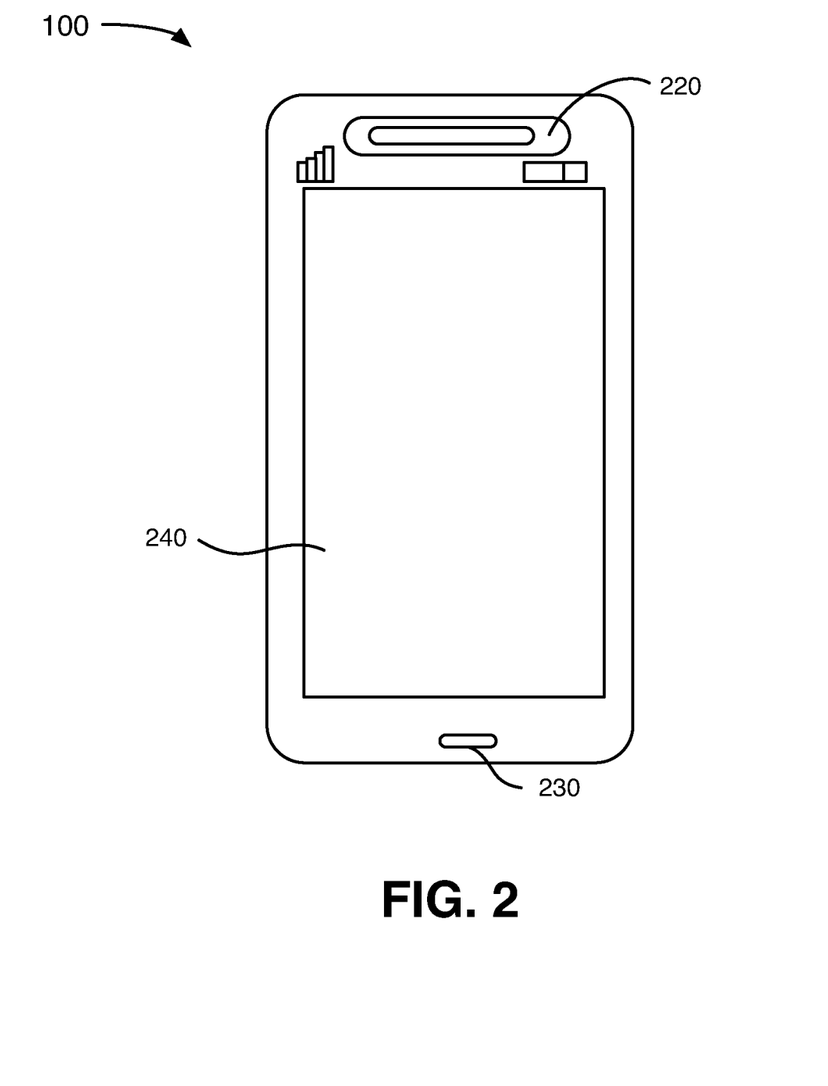
FIG. 2 is a diagram of an exemplary terminal device of FIG. 1.

FIG. 2 is a diagram of an exemplary terminal device of FIG. 1. The terminal device 100 may include a speaker 220, a microphone 230, and a display 240. As used herein, the term "terminal device" may include mobile devices such as a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Terminal devices may also be referred to as "pervasive computing" devices. It should also be understood that systems and methods described herein may also be implemented in other devices that display information of interest and allow users to interact with the displayed information. For example, terminal device may include a personal computer (PC), a laptop computer, a tablet computer, a netbook, a media playing device (e.g., an MPEG audio layer 3 (MP3) player, a video game playing device, etc.), a global positioning system (GPS) device, etc.

The speaker 220 may provide audible information to a user of the terminal device 100. For example, the speaker 220 may output music, ringtones, announcement to provide information regarding an update of the software installed in the terminal device 100, etc. The microphone 230 may receive audible information from the user of the terminal device 100.

The display 240 may be a liquid crystal display, organic liquid crystal display or any other type of display. The display 240 may provide visual information to the user. For example, the display 240 may provide the information regarding an update of the software installed in the terminal device 100. The display 240 may provide information regarding incoming or outgoing telephone calls, electronic mail (e-mail), instant messages, short message service (SMS) messages, etc. The display 240 may also display information (not shown) regarding various applications stored in the terminal device 100, such as an email program, a camera program/function, a phone book/contact list, an Internet browser used to access/download content (e.g., news or other information), etc. In an exemplary implementation, the display 240 may be a touch screen display device that allows a user to enter commands and/or information via a finger, a stylus, a mouse, a pointing device, or some other device. For example, the display 240 may be a resistive touch screen, a capacitive touch screen, an optical touch screen, an infrared touch screen, a surface acoustic wave touch screen, or any other type of touch screen device that registers an input based on a contact with the screen. The display 240 may also provide control buttons and/or a keypad, such as a soft telephone keypad (not shown), that permit the user to interact with the terminal device 100 to cause the terminal device 100 to perform one or more operations, such as place a telephone call, access information, etc.

Figure 3:
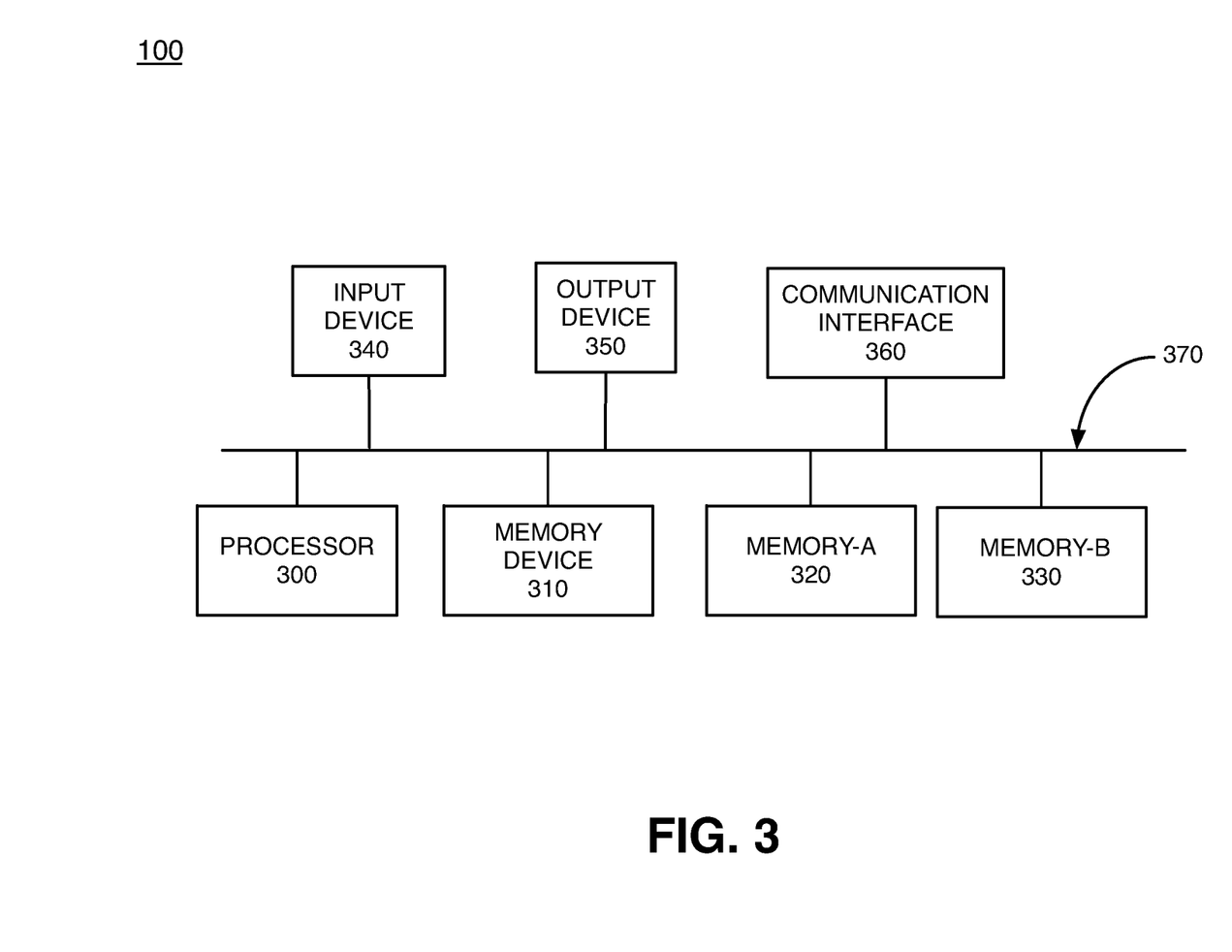
FIG. 3 is a block diagram of exemplary components of the terminal device of FIG. 1.

FIG. 3 is a block diagram of exemplary components of the terminal device of FIG. 1. The terminal device 100 may include a processor 300, a memory-A 320, a memory-B 330, an input device 340, an output device 350, and a communication interface 360. The memory-A 320 may be a volatile memory. The memory-B 330 may be a non-volatile memory. A bus 370 may permit communication among the components of the terminal device 100. One skilled in the art would recognize that the terminal device 100 may be configured in a number of other ways and may include other or different elements. For example, the terminal device 100 may include one or more modulators, demodulators, encoders, decoders, etc., for processing data.

The processor 300 may include a processor, microprocessor, an application specific integrated circuit (ASIC), field programmable gate array (FPGA) or other processing logic. The processor 300 may execute software instructions/programs or data structures to control operation of the terminal device 100.

The input device 340 may include mechanisms that permit an operator to input information to the terminal device 100, such as the microphone 230, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, a stylus, voice recognition and/or biometric mechanisms, etc. In an exemplary implementation, the display 240 may be a touch screen display that acts as an input device.

The output device 350 may include one or more mechanisms that provides an output corresponding to output information to the user, including a display, such as the display 240, a printer, one or more speakers, such as speaker 220, etc. As described above, in an exemplary implementation, the display 240 may be a touch screen display. In such an implementation, the display 240 may function as both an input device and an output device.

The communication interface 360 may include a transceiver that enables the terminal device 100 to communicate with other devices and/or systems. For example, the communication interface 360 may include a modem or an Ethernet interface to a LAN. The communication interface 360 may also include mechanisms for communicating via a network, such as a wireless network. For example, the communication interface 360 may include one or more radio frequency (RF) transmitters, receivers and/or transceivers and one or more antennas for transmitting and receiving RF data via a network.

As illustrated in FIG. 3, a memory device 310 may be coupled with the terminal device 100 so that a memory device 310 is included in the terminal device 100. Alternatively, the memory device 310 may be externally coupled with the terminal device 100.

The terminal device 100 may be coupled with a plurality of memory devices (not shown) may be coupled with the terminal device 100 so that the plurality of memory devices are included in the terminal device 100. Alternatively, the plurality of memory devices may be externally coupled with the terminal device 100.

Figure 4:
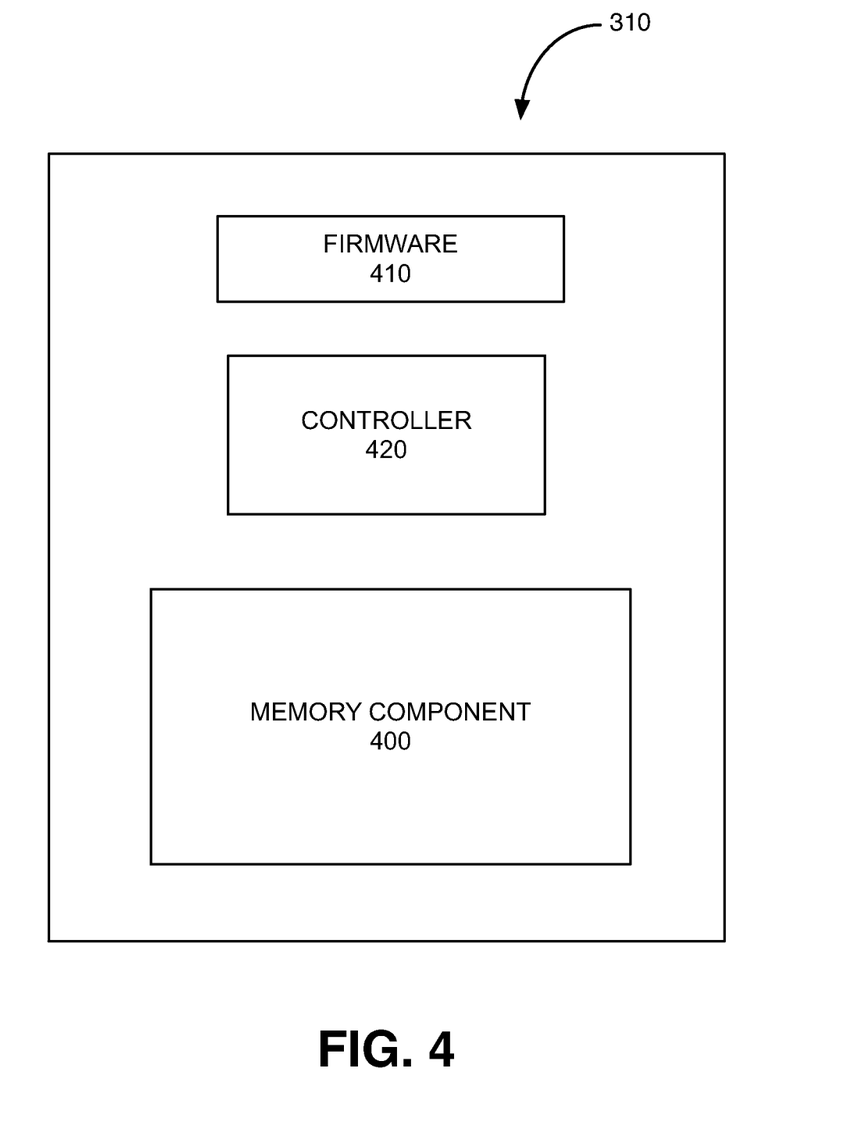
FIG. 4 is a block diagram of exemplary components in the memory device of FIG. 3.

FIG. 4 is a block diagram of exemplary components in the memory device of FIG. 3. The memory device 310 may include a memory component 400 and firmware 410 configured to operate the memory device 310. The memory device 310 may further include a controller 420. The controller 420 may be operated by the firmware 410. The memory component 400 may include one or more memory elements.

The memory device 310 may be an embedded Multi Media Card (eMMC) device. The one or more memory elements of the eMMC device may be one or more flash memory elements. The flash memory elements may include one or more NAND flash memory elements. The controller 420 of the eMMC device may be configured to control the flash memory elements according to the firmware 410 of the eMMC.

Generally, firmware of each memory device may be provided by a vendor of each memory device. Performance of each memory device may depend on configuration of each firmware. The performance of each memory device may include read performance, write performance, and other functional performances. The read performance may be represented by a read speed. The write performance may be represented by a write speed. According to the firmware, the write performance or the write speed may vary more than the read performance or the read speed. Therefore, the write speed may be relied on to evaluate a length of time to be taken to update software stored in each memory device.

Occasionally, the vendor of each memory device may modify the firmware of each memory device, and may update one version of the firmware installed in a memory device to another version of the firmware. However, the vendor may not update the firmware of all the memory devices having the same product. Accordingly, memory devices having the same product name may not include the same version of the firmware.

The performance of the memory device 310 coupled with the terminal device 100 may depend on the firmware installed in the memory device 310. However, the terminal device 100 may not obtain information about which version of the firmware is currently installed in the memory device 310. Accordingly, the terminal device 100 may not obtain more accurate information regarding the performance of the memory device 310, for example, a length of time to be taken to update the software stored in the memory device 310 merely based on an identification (ID) or a product name of the memory device 310.

As one example, assume that a vendor-A provides a memory device-A1 and a memory device-A2 under the same product name/ID. The memory device-A1 may include a version-1 of the firmware, while the memory device-A2 may include a version-2 of the firmware. The version-2 may be an updated version of the version 1. For example, when the memory device-A1 and the memory device-A2 are eMMCs having the same product name, a write speed of an eMMC including the version-1 of the firmware may be 5.0 Megabits per second (Mbps), while a write speed of an eMMC including the version-2 of the firmware may be 10.0 Mbps. Whether the memory device 310 coupled with the terminal device 100 is the memory device-A1 or the memory device-A2, the terminal device 100 may not obtain, based on the product name/ID, information about which version of the firmware is currently installed in the memory device 310. Accordingly, the terminal device 100 may not obtain information regarding the performance of the memory device 310, for example, the length of time to be taken to update the software stored in the memory device 310 merely based on an identification (ID) or a product name of the memory device 310.

As another example, assume that the same manufacturer produces three terminal devices which include a memory device-D, a memory device-E, and a memory device-F, respectively. The memory device-D, the memory device-E, and the memory device-F may be provided by a vendor-D, a vendor-E, and a vendor-F, respectively. The vendor-D may provide either version-1 or version 2 of firmware for the memory device-D. The vendor-E may provide either version-1 or version 2 of firmware for the memory device-E. The vendor-F may provide either version-1 or version 2 of firmware for the memory device-F. However, the three terminal devices may not obtain information about which version of the firmware is currently installed in the memory device-D, the memory device-E, and the memory device-F, respectively. Accordingly, the three terminal devices may not obtain information regarding performance of each of the memory device-A, the memory device-B, and the memory device-C, for example, a length of time to be taken to update the software stored in the memory device-A, the memory device-B, and the memory device-C, respectively.

Figure 5:
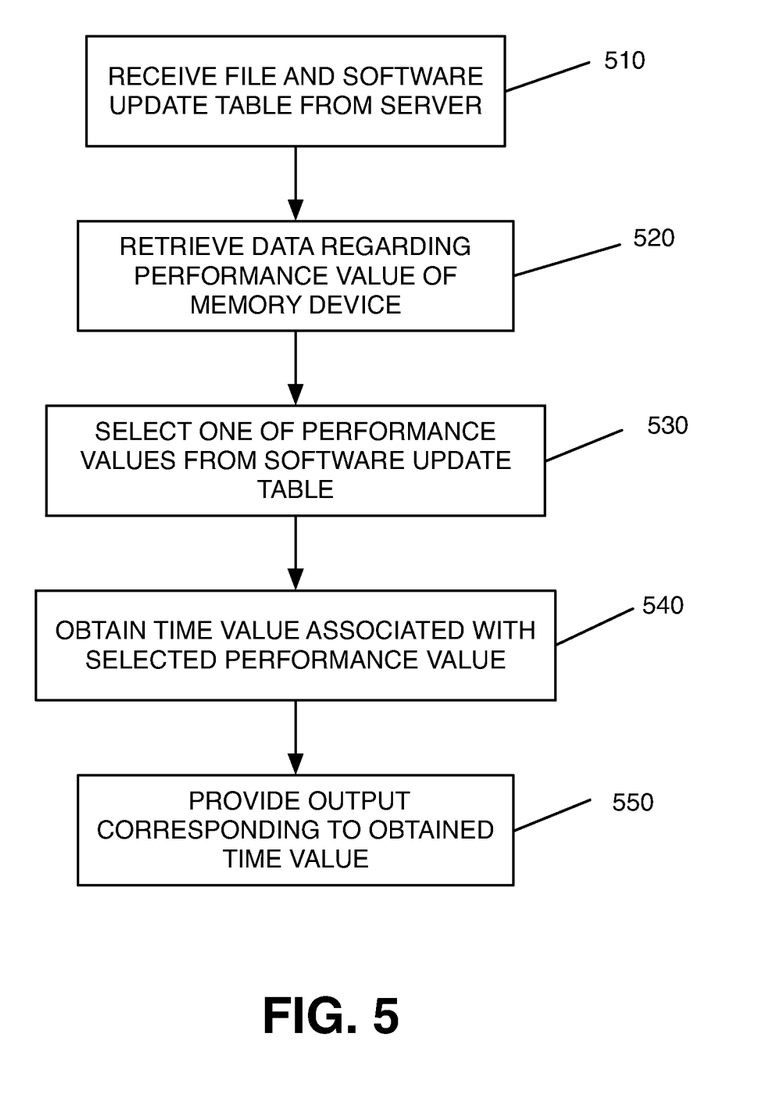
FIG. 5 is a flowchart illustrating an exemplary process for notifying a user of a length of time to be taken to update the software stored in the memory device of FIG. 4.

FIG. 5 is a flowchart illustrating an exemplary process for notifying a user of a length of time to be taken to update the software stored in the memory device of FIG. 4.

The communication interface 360 of the terminal device 100 may receive, from the server 110 via the network 120, a file for updating the software stored in the memory device 310, and a software update table (block 510). Alternatively, the communication interface 360 may receive, from a plurality of servers via the network 120, a file for updating the software stored in the memory device 310, and a software update table, independently.

The file for updating the software stored in the memory device 310 may be a difference file for updating the software using FOTA technology. The difference file may include data regarding differences between different files which include data regarding different versions of the software, respectively. For example, the difference file may include data regarding differences of source codes between the different versions of the software.

The software update table may include data regarding one or more performance values and data regarding one or more lengths of time taken to update the software using the file, respectively. Each of the one or more performance values may be associated with one of the one or more time values indicative of the one or more lengths of time taken to update the software using the file.

Figure 6:
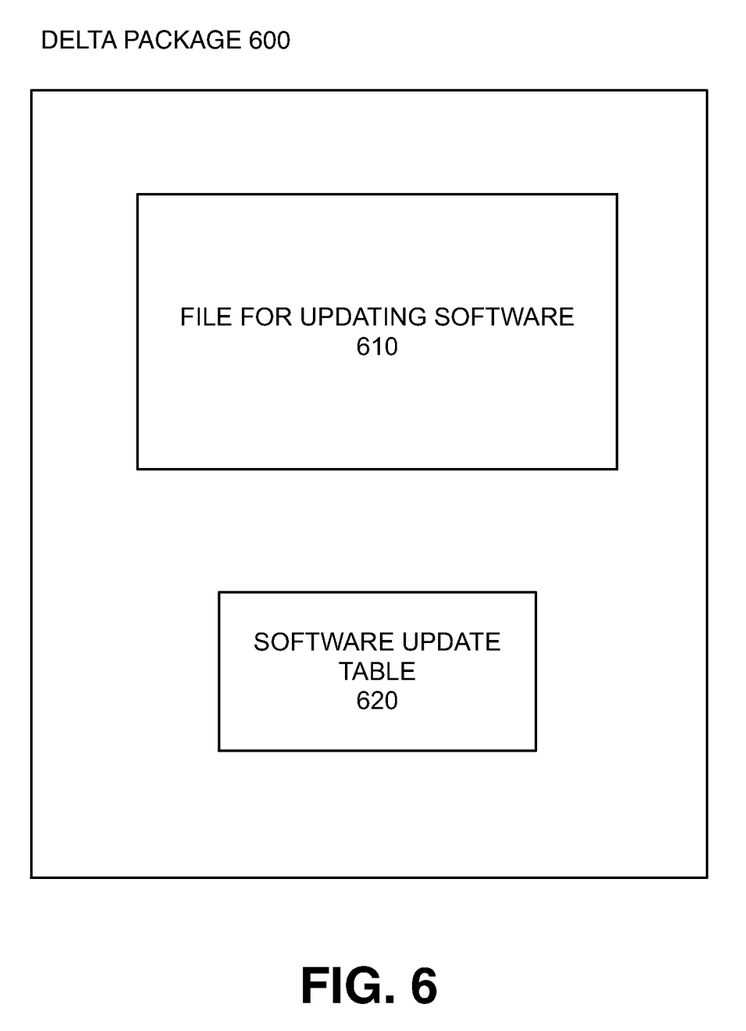
FIG. 6 is a diagram of an exemplary delta package.

The terminal device 100 may receive the file and the software update table in form of a delta package. FIG. 6 is a diagram of an exemplary delta package. The delta package 600 may include the file 610 for updating the software stored in the memory device 310, and the software update table 620.

Data of the file and data of the software update table may be stored in the memory-A 320 of the terminal device 100. Data regarding a performance value of the memory device 310 may be stored in the memory-B 330 of the terminal device 100.

The terminal device 100 may reboot, and launch an update engine configured to update the software. The processor 300 may obtain the data regarding the performance value of the memory device 310 (block 520). For example, the processor 300 may retrieve from the memory-B 330 of the terminal device 100, the data regarding the performance value of the memory device 310. The processor 300 may select, from the software update table 620, one of the one or more performance values based on the performance value of the memory device 310 (block 530). The processor 300 may obtain, from the software update table 620, a time value associated with the selected performance value (block 540). The time value may indicate an estimated length of time to be taken to update the software in the memory device 310. To notify the user of the obtained time value, the output device 350 may provide an output corresponding to the obtained time value (block 550).

The performance value of the memory device 310 may indicate a write speed of the memory device 310. The one or more performance values included in the software update table 620 may indicate one or more write speeds of one or various memory devices. The various memory devices may include the memory device 310 coupled with the terminal device 100. Alternatively, the one or more performance values in the update software table 620 may indicate one or more estimated write speeds.

The selected performance value may match the performance value of the memory device 310 coupled with the terminal device 100. For example, the processor 300 may select, from the software update table, a write speed which matches the obtained write speed of the memory device 310.

The write speed of the memory device 310 may be calculated based on a size of the software and a length of time taken to write data of the software on the memory device 310. The length of time taken to write the data of the software on the memory device 310 may be obtained by measuring a length of time between a point of time of starting to write the data of the software and a point of time of completing to write the data of the software on the memory device 310.

The measured length of time may include a length of time taken to erase all or a part of the memory device 310. In some instances, the length of time taken to erase the memory device 310 may be ignored, compared with a length of time taken to write the data of the software on the memory device 310. Accordingly, the measured length of time including time taken to erase and write the memory device 310 may be considered as the length of time taken to write the data of the software on the memory device 310.

The write speed of each of the one or various memory devices may be calculated based on a size of the software and a length of time taken to write the data of the software on each of the one or various memory devices. The length of time taken to write the data of the software on each of the one or various memory devices may be measured between a point of time of starting to write the data of the software and a point of time of completing to while data of the software on each of the one or various memory devices.

The software update table 620 may further include data regarding one or more IDs of the one or various memory devices. Each of the one or more IDs may indicate a vendor providing each of the one or various memory devices. The various memory devices may include memory devices provided by the same vendor and/or different vendors. The various memory devices provided by the same vendor may include memory devices having different product names and/or memory devices having the same product name with different versions of firmware. Each of the one or more performance values in the software update table 620 may be associated with one of the one or more IDs. Each ID may indicate an identification of one of the one or more vendors, or one of one or more product names.

The terminal device 100 may obtain an ID of the memory device 310 coupled with the terminal device 100. For example, the processor 300 may obtain the ID of the memory device 310 from the memory device 310. Alternatively, the ID of the memory device 310 may be stored in the memory-B 330. The processor 300 may obtain the ID of the memory device 310 from the memory-B 330.

As described above, the software update table may include a plurality of performance values associated with one of the one or more IDs. The processor 300 may select, from the software update table 620, one or more performance values associated with an ID matching the ID of the memory device 310. The processor 300 may select a performance value among the one or more performance values associated with an ID matching the ID of the memory device 310, based on the obtained performance value. For example, the processor 300 may select a performance value matching the obtained performance value among the one or more performance values associated with an ID matching the ID of the memory device 310. The processor 300 may obtain, from the software update table, a time value associated with the selected performance value.

To notify the user of the terminal device 100 of the obtained time value, the output device 350 of the terminal device 100 may provide the output corresponding to the obtained time value, by displaying information corresponding to the obtained time value on the display 240 of the terminal device 100, and/or generating an audible output corresponding to the obtained time value at the speaker 220. For example, the terminal device 100 may display a numerical number indicating the obtained time value. Alternatively, the terminal device 100 may generate an artificial voice indicating the time value at the speaker 220.

While the software is being updated, the terminal device 100 may not be used. For example, when the terminal device 100 is a cellular phone, the user may not receive a call/message or send a call/message. The user of the terminal device 100 may want to determine whether to start, decline, postpone, or stop an update of the software according to the notified length of time to be taken to update the software.

The terminal device 100 may allow a user of the terminal device 100 to start, decline, postpone, or stop an update of the software upon notifying the user of the obtained time value. For example, the user may register an input for instructing to start, decline, postpone, or stop the update of the software stored in the memory device 310 from the input device 340. Upon the user's input of instructing to start an update of the software stored in the memory device 310, the processor 300 may start the update of the software stored in the memory device 310 using the file.

Figure 7:
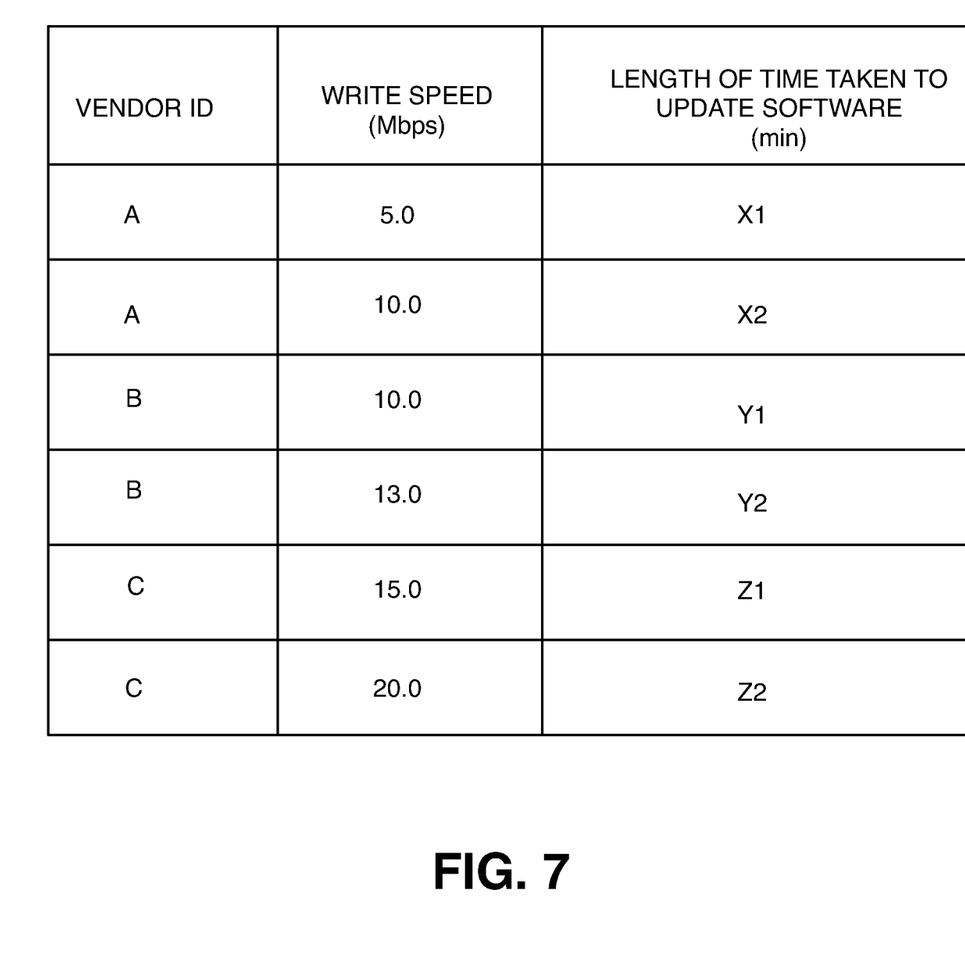
FIG. 7 is an exemplary configuration of a software update table.

FIG. 7 is an exemplary configuration of a software update table. The software update table 620 may include respective vendor IDs, A, B, C of Vendor-A, Vendor-B, Vendor-C. Associated with Vendor ID=A, two write speeds: 5 Mbps and 10 Mbps are included, associated with respective two lengths of time taken to update the software: X1 minutes and X2 minutes, in the software update table 620. Associated with Vendor ID=B, two write speeds: 10 Mbps and 13 Mbps are included, associated with respective two lengths of time taken to update the software: Y1 minutes and Y2 minutes, in the software update table 620. Associated with Vendor ID=C, two write speeds: 15 Mbps and 20 Mbps are included, associated with respective two lengths of time taken to update the software: Z1 minutes and Z2 minutes, in the software update table 620. X1, X2, Y1, Y2, Z1, and Z2 may be measured when the software is updated on the respective memory devices. The software update table 620 may include an estimated write speed and an estimated length of time to be taken to update the software associated with the estimated write speed.

Where a plurality of memory devices having the same product name include the same firmware, the plurality of memory devices may represent different performance according to physical properties of the plurality of memory devices or other causes. For example, the plurality of memory devices including the same firmware may present approximately 20% deviation in a length of time taken to update the software stored in the plurality of memory devices. Assume that a length of time taken to update the software in one of the plurality of memory devices including the same firmware is 10 minutes, lengths of time taken to update the software stored in the other memory devices including the same firmware may be from 8 minutes to 12 minutes.

The length of time to be taken to update the software stored in the memory device 310 may be revised by monitoring a size of an updated portion and a length of time taken to update the portion during the update of the software. During the update of the software stored in the memory device 310, the user may be notified of the revised length of time to be taken to update the software as more accurate information, regardless of the deviation in the performance of the memory devices including the same firmware.

Figure 8:
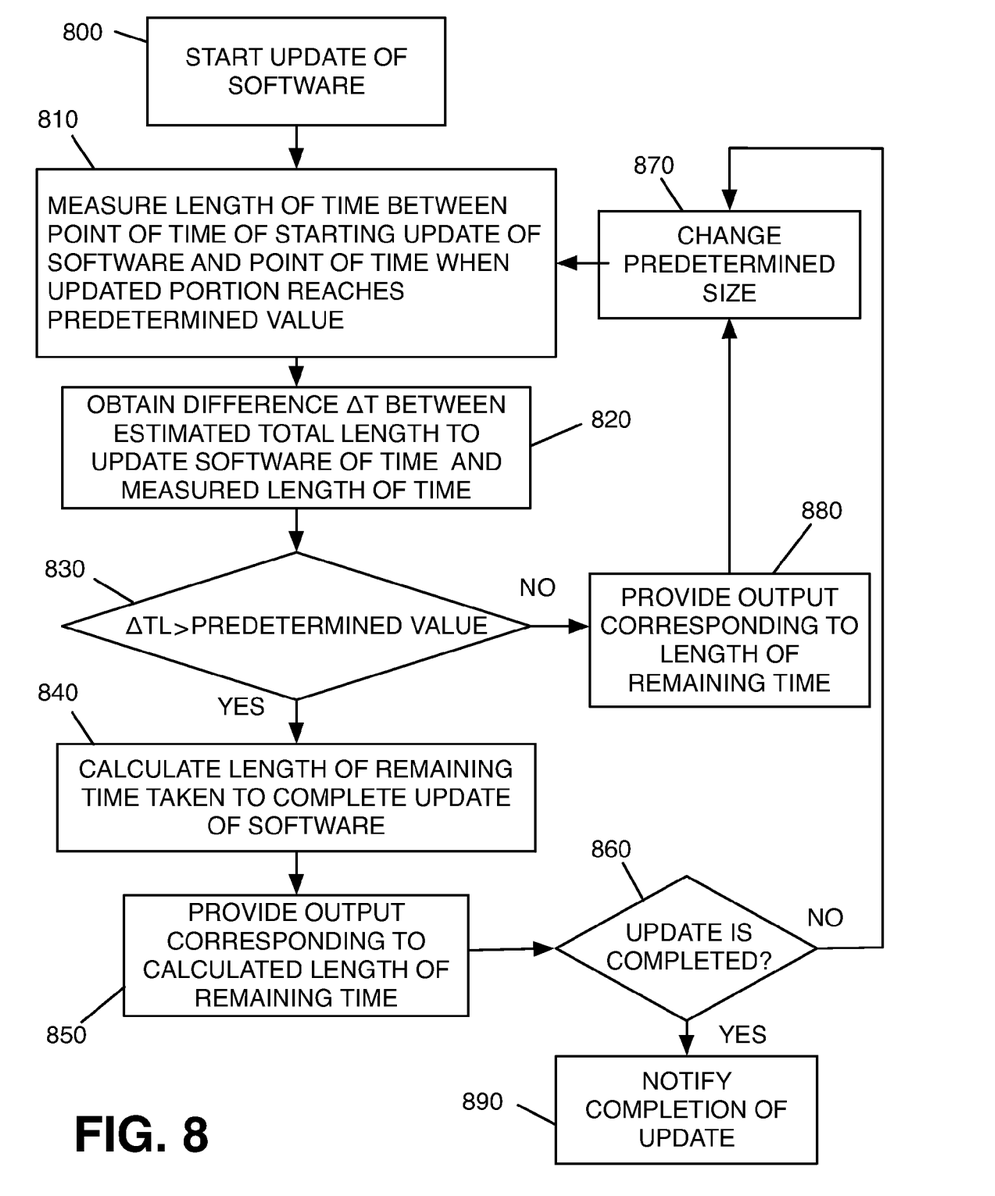
FIG. 8 is a flowchart of an exemplary process for notifying a user of a length of remaining time to complete an update of the software stored in the memory device of FIG. 4 during the update of the software.

FIG. 8 is a flowchart of an exemplary process for notifying a user of a length of remaining time to complete an update of the software stored in the memory device of FIG. 4 during the update of the software.

Define that TL is an estimated total length of time to be taken to update the software stored in the memory device 310. The processor 300 may obtain the estimated total length of time TL. The estimated total length of time TL may be the time value obtained as described above. The processor 300 may start the update of the software stored in the memory device 310 using the file (block 800). The update of the software may be started automatically when the terminal device 100 receives the file and the software update table from the server 110 via the network 120. Alternatively, the update of the software may be started upon the user's input to instruct the processor 300 to start the update of the software. Define that TL1 is a first length of time between a point of time of starting the update of the software and a first point of time during the update of the software. The first length of time TL1 may be measured by, for example, a timer or a clock implemented in the terminal device 100 (block 810). The first point of time may be a point of time when a size of an updated portion of the software reaches a predetermined size. The predetermined size may be represented by a percentage of the entire portion to be updated in the software.

Define that TL1' is an estimated first length of time between the point of time of starting the update of the software and a point of time when the size of the updated portion of the software reaches the predetermined size. The processor 300 may obtain the estimated first length of time TL1', based on the predetermined size and the estimated total length of time TL.

The processor 300 may obtain a difference $\Delta TL$ between the estimated first length of time TL1' and the measured first length of time TL1 (block 820). The processor 300 may determine whether the difference $\Delta TL$ is more than predetermined value (block 830). The predetermined value may be 0 minutes, or more than 0 minutes (e.g. 1 minute, 3 minutes, etc.).

If the processor 300 determines that the difference $\Delta TL$ is more than the predetermined value (block 830—YES), the processor 300 may calculate a first length of remaining time to complete the update TR1, based on the predetermined size and the measured first length of time TL1 (block 840). The terminal device 100 may provide an output corresponding to the first length of remaining time TR1 (block 850).

If the processor 300 determines that the difference $\Delta TL$ is equal to or less than the predetermined value (block 830—NO), the processor 300 may not calculate the first length of remaining time TR1. Instead, the processor 300 may calculate a length of remaining time TR1', based on the estimated total length of time TL and the estimated first length of time TL1'. The output device may provide an output corresponding to the length of remaining time TR1' (block 880).

For example, assume that the predetermined value is 0 minutes. When the difference $\Delta TL$ is equal to 0 minutes, the processor 300 may not calculate the first length of remaining time TR1, and the processor 300 may calculate a length of remaining time TR1', based on the estimated total length of time TL and the estimated first length of time TL1'. Or, assume that the predetermined value is 3 minutes. When the difference $\Delta TL$ is equal to or less than 3 minutes, e.g. 2 minutes, the processor 300 may not calculate the first length of remaining time TR1, and the processor 300 may calculate a length of remaining time TR1', based on the estimated total length of time TL and the estimated first length of time TL1'.

The processor 300 may determine whether the update of the software is completed (block 860). If the update of the software is determined as not being completed, the processor 300 may change the predetermined size to an other size (block 870). The other size may be more than the predetermined size. The processes presented by block 820 through block 870 may be repeated until the processor 300 determines that the update of the software is completed.

For example, assume that the predetermined size is set to a % (for example, 10%) of the entire portion to be updated in the software. The estimated total length of time TL may be the time value obtained as illustrated in FIG. 5. The first length of time TL1 between the point of time of starting the update of the software and the first point of time when the updated portion of the software reaches a % of the entire portion to be updated in the software may be measured by the timer or the clock (a is a number more than 0 and less than 100). The processor 300 may compare the measured first length of time TL1 with the estimated first length of time TL1' or TL×a/100. The processor 300 may calculate a difference $\Delta TL=|TL\times a/100-TL1|$.

Assume that the predetermined value is 0 minutes. If the processor 300 determines that the difference $\Delta TL$ is more than 0 minutes, the processor 300 may calculate the first length of remaining time TR1, based on the size (a %) of the updated portion and the measured first length of time TL1. For example, the processor 300 may obtain the first length of remaining time TR1 by calculating: $TR1=TL1\times(100-a)/a$.

While the update of the software is determined as not being completed, the processor 300 may change the predetermined size to b % (for example, 20%) of the entire portion to be updated in the software. Define that TL2 is a second length of time between the point of time of starting the update of the software and the second point of time when the updated portion of the software reaches b % of the entire portion to be updated in the software. The second length of time TL2 may be measured by, for example, the timer or the clock. Define that TL2' is an estimated second length of time between the point of time of starting the update of the software and a point of time when the size of the updated portion of the software reaches the other size.

The processor 300 may compare the measured second length of time TL2 with the estimated second length of time TL2' or TL×b/100. The processor 300 may calculate a difference $\Delta TL=|TL\times b/100-TL2|$.

If the processor 300 determines that a difference $\Delta TL=|TL\times b/100-TL2|$ is more than 0 minutes, the processor 300 may calculate a second length of remaining time to complete the update of the software TR2, based on the other size and the measured second length TL2. For example, the processor 300 may obtain the second length of remaining time TR2 by calculating: $TR2=TL2\times(100-b)/b$.

If the processor 300 determines that the difference $\Delta TL$ is equal to or less than the predetermined value, the processor 300 may not calculate the second length of remaining time TR2. Instead, the processor 300 may calculate a second length of remaining time TR2', based on the estimated total length TL and the estimated second length of time TL2'.

The output device 350 may provide an output corresponding to the length of remaining time TR' (block 880).

To notify the user of the length of remaining time TR1, TR2, TR1', or TR2', the output device 350 of the terminal device 100 may provide an output corresponding to the length of remaining time TR1, TR2, TR1', or TR2'. For example, the terminal device 100 may display information corresponding to TR1, TR2, TR1', or TR2' on the display 240 of the terminal device 100, and/or generate a sound corresponding to TR1, TR2, TR1', or TR2' at the speaker 220. The terminal device 100 may display a numerical number indicating TR1, TR2, TR1', or TR2' on the display 240. The terminal device 100 may generate an artificial voice indicating TR1, TR2, TR1', or TR2' at the speaker 220.

CONCLUSION

Embodiments discussed above may allow for notification of a length of time to be taken to update software in a memory device coupled with a terminal device, and/or revision of a length of remaining time to complete the update of the software.

The foregoing description of implementations provides illustration, but is not intended to be exhaustive or to limit the implementations to the precise form disclosed. Modifications and variations are possible in light of the above teachings or may be acquired from practice of the teachings.

For example, although the embodiments discussed above describe a terminal device including a memory device, the terminal device may include a plurality of memory devices. Each of the plurality of memory devices may be provided by different vendors. Each of the plurality of memory devices may include different firmware, respectively. When the software is stored in the plurality of memory devices, a length of time to be taken to update the software may be obtained by considering a performance value of each memory device.

Additionally, while series of blocks have been described with regard to the exemplary processes in FIGS. 5 and 8, the order of the blocks may be modified in other implementations. In addition, non-dependent blocks may represent acts that can be performed in parallel to other blocks.

Aspects described herein may be implemented in many different forms of software, firmware, and hardware in the implementations illustrated in the figures. The actual software code or specialized control hardware used to implement aspects does not limit the invention. Thus, the operation and behavior of the aspects were described without various to the specific software code—it being understood that software and control hardware can be designed to implement the aspects based on the description herein.

The term "comprises/comprising," "include/including," and "have/having" as used herein, specifies the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

As used herein, the term "coupled" should be construed as the joining of two members directly, indirectly, electrically, or wirelessly to one another. Such joining may be stationary in nature or movable in nature and/or such joining may allow for the flow of electricity, electrical signals, radio frequency signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the terms "include," "for example," "such as," and the like are used illustratively and are not intended to limit the embodiments.

What is claimed is:

1. A terminal device, comprising:
   a communication interface configured to receive, from a server via a network, a file for updating software stored in a memory device coupled with the terminal device, and a software update table wherein the software update table includes data regarding one or more performance values and data regarding one or more time values indicative of one or more lengths of time taken to update the software using the file, respectively, and each of the one or more performance values is associated with one of the one or more time values;
   a processor configured to
      obtain data regarding a performance value of the memory device,
      select, from the software update table, one of the one or more performance values based on the performance value of the memory device, and
      obtain, from the software update table, a time value associated with the selected performance value; and
   an output device configured to provide an output corresponding to the obtained time value.

2. The terminal device of claim 1, wherein the memory device is an embedded Multi Media Card.

3. The terminal device of claim 1, wherein the server is a Firmware Over-The Air (FOTA) server.

4. The terminal device of claim 1, wherein the file is a difference file for updating the software using FOTA technology.

5. The terminal device of claim 1, wherein the performance value of the memory device indicates a write speed of the memory device.

6. The terminal device of claim 1, wherein the one or more performance values included in the software update table indicate one or more write speeds of one or various memory devices, respectively.

7. The terminal device of claim 5, wherein the write speed is calculated based on a size of the software and a length of time taken to write the software on the memory device.

8. The terminal device of claim 1, wherein the selected performance value matches the performance value of the memory device.

9. The terminal device of claim 1, wherein the software update table further includes data regarding identifications (IDs) of various memory devices, and each of the one or more performance values is associated with one of the IDs.

10. The terminal device of claim 9, wherein the IDs identifies vendors providing the various memory devices, respectively.

11. The terminal device of claim 9, wherein the processor is further configured to:
   obtain an ID of the memory device, and
   select, from the software update table, one or more performance values associated with an ID matching the ID of the memory device,
   wherein the selected one of the one or more performance values based on the performance value of the memory device is one of the selected one or more performance values associated with an ID matching the ID of the memory device.

12. The terminal device of claim 1, wherein the output device is configured to provide the output corresponding to the obtained time value by at least one of:
   displaying information corresponding to the obtained time value on a display of the terminal device, and
   generating audible information corresponding to the obtained time value.

13. The terminal device of claim 1, wherein the processor is further configured to:
   allow a user of the terminal device to start, decline, postpone, or stop an update of the software based on the obtained time value.

14. A terminal device, comprising:
   a processor configured to:
      obtain an estimated total length of time to be taken for an update of software stored in a memory device coupled with the terminal device,
      obtain a measured first length of time between a point of time of starting the update of the software and a first point of time when a size of an updated portion of the software reaches a predetermined size,
      obtain an estimated first length of time between the point of time of starting the update of the software and a point of time when the size of the updated portion of the software reaches the predetermined size, based on the estimated length of time and the predetermined size,
      obtain a difference between the estimated first length of time and the measured first length of time, and
      when the difference is more than a predetermined value, calculate a first length of remaining time to be taken to complete the update of the software, based on the measured first length of time and the predetermined size; and
   an output device configured to provide an output corresponding to the calculated first length of remaining time.

15. The terminal device of claim 14, wherein
   the processor is further configured to:
      determine whether the update of the software is completed, and
      if the update of the software is determined as not being completed, change the predetermined size to an other size,
      obtain a measured second length of time between the point of time of starting the update of the software and a second point of time when the size of the updated portion in the software reaches the other size, and calculate a second length of remaining time to be taken to complete the update of the software, based on the measured second length of time and the other size, and the output device is further configured to provide an output corresponding to the calculated second length of remaining time.

16. The terminal device of claim 14, wherein the processor is further configured to obtain a length of remaining time to be taken to complete the update of the software, based on the predetermined size and the obtained total length of time, when the difference is equal to or less than the predetermined value, and the output device is further configured to provide an output corresponding to the obtained length of remaining time.

17. A method implemented by a terminal device, comprising:

receiving, from a server via a network, a file for updating software stored in a memory device coupled with the terminal device, and a software update table wherein the software update table includes data regarding one or more performance values and data regarding one or more time values indicative of one or more lengths of time taken to update the software using the file, respectively, and each of the one or more performance values is associated with one of the one or more time values;

obtaining data regarding a performance value of the memory device;

selecting, from the software update table, one of the one or more performance values based on the performance value of the memory device;

obtaining, from the software update table, a time value associated with the selected performance value; and providing an output corresponding to the obtained time value at an output device of the terminal device.

18. A method implemented by a terminal device, comprising:

obtaining, from a server via a network, an estimated total length of time to be taken for an update of software stored in a memory device coupled with the terminal device;

obtaining a measured first length of time between a point of time of starting the update of the software and a first point of time when a size of an updated portion of the software reaches a predetermined size;

obtaining an estimated first length of time between the point of time of starting the update of the software and a point of time when the size of the updated portion of the software reaches the predetermined size, based on the estimated length of time and the predetermined size;

obtaining a difference between the estimated first length of time and the measured first length of time;

when the difference is more than a predetermined value, calculate a first length of remaining time to be taken to complete the update of the software, based on the measured first length of time and the predetermined size; and providing an output corresponding to the calculated first length of remaining time at an output device of the terminal device.

19. The method of claim 18, further comprising:

determining whether the update of the software is completed;

if the update of the software is determined as not being completed, changing the predetermined size to an other size;

obtaining a measured second length of time between the point of time of starting the update of the software and a second point of time when the size of the updated portion in the software reaches the other size;

calculating a second length of remaining time to be taken to complete the update of the software, based on the measured second length of time and the other size; and providing an output corresponding to the calculated second length of remaining time at the output device of the terminal device.

20. The method of claim 18, further comprising:

when the difference is equal to or less than the predetermined value, obtaining a length of remaining time to be taken to complete the update of the software, based on the predetermined size and the obtained length of time;

providing an output corresponding to the obtained length of remaining time at the output device of the terminal device.

* * * * *